Patented May 12, 1942

2,282,527

UNITED STATES PATENT OFFICE 2,282,527

PIGMENT TRANSFER

John Owen Morrison, Chatham, and Ben H. Perkins, Jersey City, N. J., assignors to E. I. du Pont de Nemours & Company, Wilmington, Del., a corporation of Delaware No Drawing. Application June 1, 1940, Serial No. 338,376

16 Claims. (Cl. 106—259)

This invention relates to a process for preparing coating compositions by direct transfer of a pigment from an aqueous system to an oily vehicle and, more particularly, it relates to the use of a novel agent to promote this transfer to the oily vehicle.

The art of preparing coating compositions by the direct transfer of pigments from an aqueous to an oily phase is old. Thus, the process has been well known for many years in the manufacture of white lead in oil in which a water paste of white lead is worked with linseed oil so that the water is liberated and the pigment is transferred to the oily phase. This avoids the necessity of drying the pigment and then grinding the same into the oily vehicle.

There is considerable art describing processes of transferring pigments in this manner. It seems to be assumed throughout that an agent is required and that a fatty acid compound such as an insoluble metallic soap or the free fatty acid is the most desirable agent. These compounds may all be classified as anion-active agents, that is, the surface-active organic part of the molecule is in the negative radical or anion.

Recently, certain cation-active materials have been proposed as agents for promoting this transfer. Sloan and Patterson U. S. 2,192,954 use cation-active compounds comprising certain long chain amines, long chain quarternary ammonium, long chain sulfonium and long chain phosphonium compounds containing an aliphatic chain of at least 8 carbon atoms in the positive radical. Ryan U. S. 2,126,925 uses an aliphatic amine having at least 3 carbon atoms in the alkyl chain.

We have found that many pigments, particularly pigments which are strongly hydrophilic in nature, such as iron blues, alumina hydrate, and the like, have failed almost completely in responding to the anion-active agents. While they have responded to some extent with the amines of Ryan and the cation-active compounds of Sloan et al., we have found that they are very readily and completely transferred by employing the herein described agents of our invention.

This invention has as an object the improvement of processes for transferring pigments from aqueous to oily vehicles. Additional objects will become apparent from an examination of the following description and claims.

These objects are attained according to the herein described invention which broadly comprises mixing a water wet pigment, an oily vehicle, and a petroleum nitrogen base. Mixing is continued until water separates and can be poured off leaving a relatively water-free pigment oil composition.

In a more restricted embodiment this invention comprises mixing an aqueous pigment paste, an oily vehicle, and a relatively small amount of a petroleum nitrogen base, mixing until the water separates, and thereafter removing the residual water from the composition.

The preferred embodiment of this invention comprises mixing an aqueous pigment paste, an oily vehicle, and between about 0.2% and about 10%, based on the weight of the pigment, of a reduced nitrogen base. Mixing is continued until water separates and can be poured off, leaving a relatively water-free pigment oil composition from which the final water can be removed by conventional means, such as passing over a warm three-roller mill or kneading under conditions of elevated temperatures, reduced pressures or both.

The manner in which the herein described cation-active compound is added may vary without departing from the scope of this invention. Thus, it may be added to a mixture of the aqueous pigment paste and oily vehicle or it may be added to either component thereof prior to mixing.

This invention may be more readily understood from a consideration of the following examples which are given for illustrative purposes and are not intended to place any restrictions or limitations on the herein described invention.

*Example I*

1500 parts of an iron blue presscake made in the conventional manner and containing about 25% solids was mixed with 375 parts of bodied linseed oil in a mixer capable of giving a kneading action. A uniform bulky paste resulted. While continuing the mixing, a total of 8.5 parts of reduced nitrogen bases was added in small portions. About 20 minutes after the last addition, the water suddenly separated so that about 85% of the total water could be poured off at once leaving a pigment-oil paste. The remaining water was easily removed by putting the paste over a warm three-roller mill leaving a substantially water free composition.

*Example II*

1000 parts of an iron blue presscake of conventional manufacture and containing approximately 200 parts of pigment was mixed with 225 parts of #1 regular lithographic varnish in a suitable mixer. 6 parts of reduced nitrogen bases was added to the mixture and the mixing continued for some time until separation of the water occurred.

*Example III*

1085 parts of an iron blue press cake containing 200 parts of pigment was mixed with 225 parts of #1 transparent lithographic varnish in a suitable mixer capable of giving a kneading action. 6 parts of crude nitrogen bases was added to the mixture and the mixing continued, whereupon the water separated and could be poured off.

*Example IV*

This example was like Example III except that dibutyl phthalate was substituted for the lithographic varnish and 9 parts of reduced nitrogen bases was used as the agent.

*Example V*

1060 parts of alumina hydrate paste of about 19% solids content was mixed with 300 parts of #1 transparent varnish in a suitable mixer capable of giving a kneading action. Upon the addition of 8 parts of reduced nitrogen bases and after a considerable period of stirring, the water separated and was poured off. Several passes over a warm ink mill gave a substantially water free ink.

*Example VI*

A medium shade chrome yellow paste of about 65% solids content was transferred to lithographic varnish by mixing 780 parts of paste with 165 parts of varnish and adding 3 parts of reduced nitrogen bases while continuing the mixing.

*Example VII*

A molybdate orange pigment paste of 57.5% solids content was transferred to lithographic varnish by mixing 870 parts of the paste with 125 parts of varnish and adding 5 parts of reduced nitrogen bases while continuing the mixing.

*Example VIII*

A chrome green pigment paste of 50% solids content was transferred to #1 transparent lithographic varnish by mixing 1000 parts of the paste with 200 parts of the vehicle and adding 5 parts of reduced nitrogen bases while continuing the mixing. The water separated and could be poured off.

*Example IX*

The process of this invention was applied to a lithopone pulp of 75% solids content by mixing 1330 parts of the pigment paste, 350 parts of #1 transparent lithographic varnish and 20 parts of reduced nitrogen bases.

It is to be understood that the herein specific embodiments of this invention may be subjected to variation and modification without departing from the scope and spirit thereof. Although it is preferred to employ an amount of agent within the range of between about 0.2% and about 10% it is to be understood that this invention is not limited thereto. Thus, the amount of agent used may vary widely. However, amounts in excess of about 10% produce no additional benefits and are therefore uneconomical.

Although the herein examples disclose the transfer of pigments to certain vehicles only it is to be understood that this invention is not limited thereto but includes all vehicles used in the manufacture of coating compositions. Thus, the invention is operative with vehicles including oils of a drying, semi-drying, and non-drying nature including linseed oil, Chinawood oil, castor oil, etc., bodied and blown oils including lithographic varnish, etc., resins of natural or synthetic origin including rosin, ester gum, phenol-aldehyde resins, polyhydric alcohol-polycarboxylic acid resins, etc., solutions of cellulose derivatives including nitrocellulose, cellulose acetate, ethyl cellulose, cellulose ethers, when they are not in a fibrous, or uncolloided, or friable conditions, plasticizers including dibutyl phthalate, alcohols such as butyl alcohol, amyl alcohol, and their esters, as well as other vehicles well-known to those skilled in the art. Also, it is to be understood that any combinations of the above vehicles are included under this invention.

It is well-known that pigments differ in their inherent ease of transfer from aqueous to oily systems. For instance, certain pigments such as iron blues and alumina hydrate have been notorious in their resistance to this transfer. On the other hand, some pigments, such as lithol red, transfer quite readily. It is with pigments in the first group that the most pronounced effect of this invention is found. Nevertheless the agents described are also very effective in speeding up the transfer with all pigments. Thus, the effect is present with such varied types of pigments as iron blues, chrome greens, chrome yellows, lithol reds, toluidine reds and azo pigments in general, phosphotungstic acid toners and the like, alumina hydrate, lithopone, titanium oxide pigments, phthalocyanines, vat dye pigments, and the like.

The petroleum nitrogen bases referred to herein are cation-active compounds. Cation-active organic compounds are those in which the large organic nucleus is found in that part of the molecule capable of assuming a positive charge as contrasted to the usual soap-like surface-active compounds in which the large nucleus assumes a negative charge and which may be characterized as anion-active compounds. This differentiation is discussed in more detail by H. Bertsch (Zeit. f. angew. Chemie 48, 52 (1935).

The petroleum nitrogen bases used herein are basic nitrogen containing compounds, and are by-products of the petroleum refining industry. They are found to some extent in many types of crude petroleum but some crudes contain much larger amounts than others and, in many instances, they have been a by-product for which no ready use has been known. In general, they are complex mixtures of liquids which have boiling points so close together that it has been extremely difficult to separate and purify them. The reduced nitrogen bases are obtained by processes of hydrogenation and purification.

The improved results enumerated herein are unique with our herein described cation-active compounds.

This invention will find use wherever it is desired to promote the transfer of pigments from aqueous to oil systems. The agents described herein will enable the direct transfer of pigments, particularly such pigments as iron blues, alumina hydrate, and the like, which have heretofore resisted this operation to a high degree.

As many apparently widely different embodiments of this invention may be made without departing from the spirit and scope thereof, it is to be understood that we do not limit ourselves to the specific embodiment except as defined in the appended claims.

Having described the present invention the following is claimed as new and useful:

1. In a process for transferring a pigment from an aqueous system to an oily system the step which comprises mixing a water wet pigment, an oily vehicle, and a petroleum nitrogen base.

2. In a process of transferring a pigment from an aqueous system to an oily system the steps which comprise mixing an aqueous pigment paste, an oily vehicle, and a petroleum nitrogen base, said mixing continuing until a major portion of the water separates and can be poured off.

3. In a process for transferring a pigment from an aqueous system to an oily system the steps which comprise mixing an aqueous pigment paste, an oily vehicle, and a reduced nitrogen base, said mixing continuing until the water separates, and thereafter removing the residual water from the composition.

4. In a process for transferring a pigment from an aqueous system to an oily system the steps which comprise mixing an aqueous pigment paste, an oily vehicle, and between about 0.2% and about 10%, based upon the weight of the pigment, of a reduced nitrogen base, said mixing continuing until the water separates, and thereafter removing the residual water from the composition.

5. In a process for transferring a pigment from an aqueous system to an oily system the steps which comprise mixing an aqueous iron blue paste, an oily vehicle, and a heterocyclic nitrogen base, said mixing continuing until the water separates, and thereafter removing the residual water from the composition.

6. In a process for transferring a pigment from an aqueous system to an oily system the steps which comprise mixing an aqueous alumina hydrate paste, an oily vehicle, and a heterocyclic nitrogen base, said mixing continuing until the water separates, and thereafter removing the residual water from the composition.

7. In a process for transferring a pigment from an aqueous system to an oily system the steps which comprise mixing an aqueous iron blue paste, an oily vehicle, and a petroleum nitrogen base, said mixing continuing until the water separates, and thereafter removing the residual water from the composition.

8. In a process for transferring a pigment from an aqueous system to an oily system the steps which comprise mixing an aqueous alumina hydrate paste, an oily vehicle, and a petroleum nitrogen base, said mixing continuing until the water separates, and thereafter removing the residual water from the composition.

9. In a process for transferring a pigment from an aqueous system to an oily system the steps which comprise mixing an aqueous iron blue paste, an oily vehicle, and a reduced nitrogen base, said mixing continuing until the water separates, and thereafter removing the residual water from the composition.

10. In a process for transferring a pigment from an aqueous system to an oily system the steps which comprise mixing an aqueous alumina hydrate paste, an oily vehicle, and a reduced nitrogen base, said mixing continuing until the water separates, and thereafter removing the residual water from the composition.

11. In a process for transferring a pigment from an aqueous system to an oily system the steps which comprise mixing an aqueous iron blue paste, an oily vehicle, and between about 0.2% and about 10%, based on the weight of the pigment, of a reduced nitrogen base, said mixing continuing until the water separates, and thereafter removing the residual water from the composition.

12. In a process for transferring a pigment from an aqueous system to an oily system the steps which comprise mixing an aqueous alumina hydrate paste, an oily vehicle, and between about 0.2% and about 10%, based on the weight of the pigment, of a reduced nitrogen base, said mixing continuing until the water separates, and thereafter removing the residual water from the composition.

13. In a process for transferring a pigment from an aqueous system to an oily system the steps which comprise mixing an aqueous chrome yellow paste, an oily vehicle, and a heterocyclic nitrogen base, said mixing continuing until the water separates, and thereafter removing the residual water from the composition.

14. In a process for transferring a pigment from an aqueous system to an oily system the steps which comprise mixing an aqueous chrome yellow paste, an oily vehicle, and a petroleum nitrogen base, said mixing continuing until the water separates, and thereafter removing the residual water from the composition.

15. In a process for transferring a pigment from an aqueous system to an oily system the steps which comprise mixing an aqueous chrome yellow paste, an oily vehicle, and a reduced nitrogen base, said mixing continuing until the water separates, and thereafter removing the residual water from the composition.

16. In a process for transferring a pigment from an aqueous system to an oily system the steps which comprise mixing an aqueous chrome yellow paste, an oily vehicle, and between about 0.2% and about 10%, based on the weight of the pigment, of a reduced nitrogen base, said mixing continuing until the water separates, and thereafter removing the residual water from the composition.

JOHN OWEN MORRISON.
BEN H. PERKINS.